United States Patent
Halphide et al.

(10) Patent No.: US 6,973,596 B2
(45) Date of Patent: Dec. 6, 2005

(54) TESTING OF TERMINATION CIRCUITS IN SCSI BUS CONTROLLERS

(75) Inventors: Keith R. Halphide, Rochester, MN (US); Timothy B. Lund, Kasson, MN (US); Steven P. Norgaard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 10/219,808

(22) Filed: Aug. 15, 2002

(65) Prior Publication Data

US 2004/0034812 A1    Feb. 19, 2004

(51) Int. Cl.$^7$ .............................................. G06F 11/00
(52) U.S. Cl. ........................... 714/43; 714/44; 702/58; 702/59; 702/64; 324/522; 326/30
(58) Field of Search ...................... 714/43, 44; 702/58, 702/59, 64; 324/522; 326/30

(56) References Cited

U.S. PATENT DOCUMENTS

| | | | | |
|---|---|---|---|---|
| 4,857,833 A | * | 8/1989 | Gonzalez et al. | 324/512 |
| 4,951,283 A | * | 8/1990 | Mastrocola et al. | 714/43 |
| 5,357,519 A | * | 10/1994 | Martin et al. | 714/25 |
| 5,442,305 A | * | 8/1995 | Martin et al. | 326/30 |
| 5,583,448 A | * | 12/1996 | Corder et al. | 326/30 |
| 6,341,358 B1 | * | 1/2002 | Bagg et al. | 714/43 |
| 6,826,155 B1 | * | 11/2004 | Gershon | 370/244 |
| 2003/0012046 A1 | * | 1/2003 | Lee et al. | 365/63 |
| 2003/0221140 A1 | * | 11/2003 | Bakke et al. | 714/25 |

OTHER PUBLICATIONS

Test Terminator to Enable Test of SCSI Cables, Feb. 1, 1993, IBM Technical Disclosure Bulletin, vol. 36, Issue 2, pp. 219-222.*

* cited by examiner

Primary Examiner—Robert Beausoliel
Assistant Examiner—Michael Maskulinski
(74) Attorney, Agent, or Firm—Moser, Patterson & Sheridan, L.L.P.

(57) ABSTRACT

Embodiments are provided for testing termination circuits in SCSI bus controllers. In one embodiment, the termination circuits are tested by sending test data between respective SCSI controllers of the termination circuits for varying enabled/disabled statuses of the termination circuits.

19 Claims, 3 Drawing Sheets

TESTING OF TERMINATION CIRCUITS IN SCSI BUS CONTROLLERS

BACKGROUND OF THE INVENTION

1. Field of the Invention

The present invention generally relates to SCSI (Small Computer System Interface) bus controllers, and more particularly to testing of termination circuits in SCSI bus controllers.

2. Description of the Related Art

In a conventional computer system, a SCSI bus controller is typically used to couple a SCSI bus to a PCI (Peripheral Component Interconnect) bus. One or more SCSI devices may reside on the SCSI bus. The SCSI bus controller itself is considered a SCSI device residing on the SCSI bus. Each of the SCSI devices residing on the SCSI bus has a termination circuit which connects to each of the signal lines of the SCSI bus. If a SCSI device resides at one of the two ends of the SCSI bus, the termination circuit of the SCSI device is enabled so as to minimize the reflection of the signals propagating to that end of the SCSI bus. Otherwise, reflected signals at that end of the SCSI bus may corrupt the original signals on the SCSI bus. A SCSI bus controller usually has a termination circuit which is enabled if the SCSI bus controller resides at one of the two ends of a SCSI bus. If the SCSI bus controller resides on the SCSI bus but not at the two ends of the SCSI bus, its termination circuit is disabled.

It is difficult to test the termination circuit of a SCSI bus controller. One prior-art method of testing the termination circuit of a SCSI bus controller is to power on the SCSI bus controller. Then, a diagnostic program is executed sending signals to and receiving signals from the SCSI bus of the SCSI bus controller. Finally, analog measuring devices are used to measure the voltage levels on the signal lines of the SCSI bus on the SCSI bus controller. However, these analog measuring devices are expensive, and therefore this method of testing is usually avoided.

Another prior-art method of testing the termination circuit of a SCSI bus controller is to connect the SCSI bus controller to a SCSI device via a SCSI bus so that the SCSI bus controller and the SCSI device reside at the two opposite ends of the SCSI bus. The SCSI device with its termination circuit has been tested to ensure its good operation. Then, with both the termination circuits of the SCSI bus controller and the SCSI device being enabled, diagnostic signals are sent on and sampled from the SCSI bus to test for any signal corruption. However, for any given signal line of the SCSI bus, if the termination circuit at the end of the SCSI bus corresponding to the SCSI bus controller being tested is defective, the signal line still operates in a degraded mode. That means the signal on the signal line may be corrupted sometimes (due to signal reflection at the end of the SCSI bus corresponding to the SCSI bus controller being tested) and is not corrupted during other times. As a result, it is possible that a SCSI bus controller with a defective termination circuit will pass this test, which is undesirable.

Yet another prior-art method, referred to as the "bed of nails" method, is used to test the continuity among the pins of a SCSI bus controller. However, this method does not test termination circuits of SCSI bus controllers.

Accordingly, there is a need for an apparatus and method in which testing of a SCSI bus controller is relatively more reliable in identifying SCSI bus controllers with defective termination circuits, without having to use analog measuring devices.

SUMMARY OF THE INVENTION

In one embodiment, a method is described for testing termination circuits. The method comprises providing a bus having a first end and a second end, a first termination circuit, and a second termination circuit, wherein the first and second termination circuits being coupled to the first and second ends of the bus, respectively. The method further comprises (a) enabling the first termination circuit and disabling the second termination circuit, (b) sending test signals to the bus and receiving test signals from the bus; and (c) determining that the first termination circuit is defective if the received test signals are not the same as the sent test signals.

In another embodiment, a digital system for testing termination circuits is described. The digital system comprises a first termination circuit, a second termination circuit, and a bus having a first end and a second end. The first and second termination circuits are coupled to the first and second ends of the bus, respectively. The digital system is configured to (a) enable the first termination circuit, (b) disable the second termination circuit, (c) send test signals to the bus and receive test signals from the bus, and (d) determine that the first termination circuit is defective if the received test signals are not the same as the sent test signals.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments are provided in which a method is described for testing termination circuits in SCSI bus controllers. A wrap cable couples a first SCSI bus controller to a second SCSI bus controller. The first SCSI bus controller includes a first termination circuit, and the second SCSI bus controller includes a second termination circuit. During a first step of the method, both the first and second termination circuits are enabled. The first SCSI bus controller transfers certain test data to the second SCSI bus controller via the wrap cable. If the transfer is unsuccessful, both the first and second termination circuits are considered defective. If the transfer is successful, a second step is performed during which the first step is repeated except that the second termination circuit is now disabled. If the transfer of the second step is unsuccessful, the first termination circuit is considered defective. If the transfer of the second step is successful, a third step is performed during which the first step is repeated except that the first termination circuit is now disabled. If the transfer of the third step is unsuccessful, the second termination circuit is considered defective. If the transfer of the third step is successful, both the first and second termination circuits are considered satisfactory.

Figure 1:
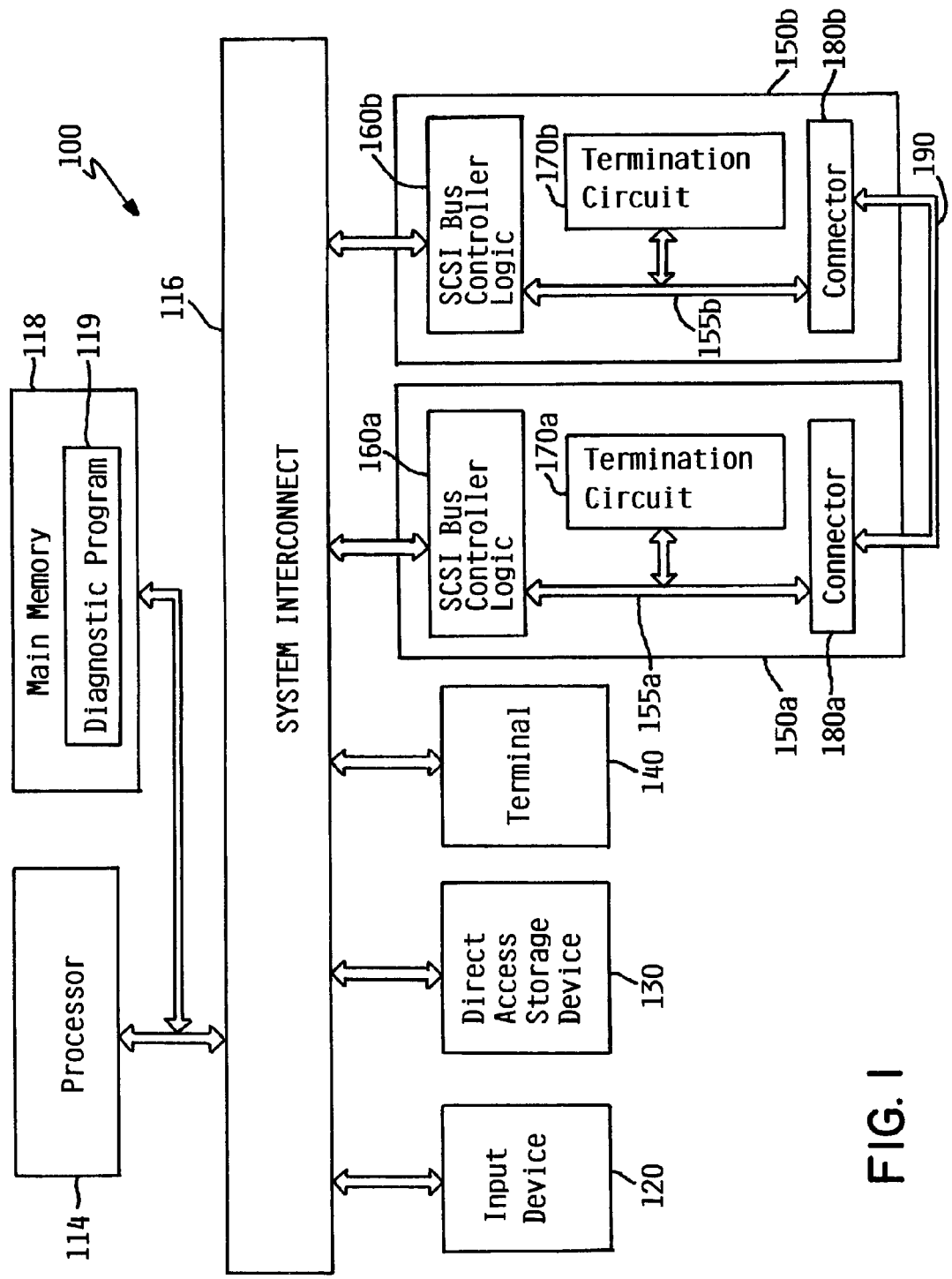
FIG. 1 is a digital system 100 according to one embodiment.

FIG. 1 is a computer system 100 according to an embodiment. In general, the computer system 100 may be a desktop or PC-based computer, a workstation, a network terminal, or other networked computer system. Illustratively, the computer system 100 includes a system interconnect 116. The computer system 100 also includes at least a processor 114, a main memory 118, an input device 120, a storage device 130, a terminal 140, and SCSI bus controllers 150a and 150b (collectively, SCSI bus controllers 150); all coupled to system interconnect 116.

Terminal 140 is any display device such as a cathode ray tube (CRT) or a plasma screen. Input device 120 can be any device to give input to the computer system 100. For example, a keyboard, keypad, light pen, touch screen, button, mouse, track ball, or speech recognition unit could be used. Further, although shown separately from the input device, the terminal 140 and input device 120 could be combined. For example, a display screen with an integrated touch screen, a display with an integrated keyboard or a speech recognition unit combined with a text speech converter could be used.

Storage device 130 is DASD (Direct Access Storage Device), although it could be any other storage such as floppy disc drives or optical storage. Although storage 130 is shown as a single unit, it could be any combination of fixed and/or removable storage devices, such as fixed disc drives, floppy disc drives, tape drives, removable memory cards, or optical storage. Main memory 118 and storage device 130 could be part of one virtual address space spanning multiple primary and secondary storage devices.

The contents of main memory 118 can be loaded from and stored to the storage device 130 as the processor 114 has a need for it. Main memory 118 is any memory device sufficiently large to hold the necessary programming and data structures of the invention. The main memory 118 could be one or a combination of memory devices, including random access memory (RAM), non-volatile or backup memory such as programmable or flash memory or read-only memory (ROM). The main memory 118 may be physically located in another part of the computer system 100. While main memory 118 is shown as a single entity, it should be understood that memory 118 may in fact comprise a plurality of modules, and that main memory 118 may exist at multiple levels, from high speed to low speed memory devices.

The SCSI bus controllers 150 can be any SCSI bus controllers that are capable of coupling the system interconnect 116 to a SCSI bus. In one embodiment, the SCSI bus controller 150a comprises SCSI bus controller logic 160a, a termination circuit 170a, and a connector 180a, coupled together via a SCSI bus 155a. The SCSI bus controller 150a can enable or disable the termination circuit 170a. Similarly, the SCSI bus controller 150b comprises SCSI bus controller logic 160b, a termination circuit 170b, and a connector 180b, coupled together via a SCSI bus 155b. The SCSI bus controller 150a can enable or disable the termination circuit 170a.

The connector 180a is coupled to the connector 180b via a wrap cable 190. Together, the SCSI bus 155a, the wrap cable 190, and the SCSI bus 155b form a SCSI bus (referred to herein as "SCSI bus 155a, 190, 155b") with the two SCSI bus controllers 150a and 150b at the two ends of the SCSI bus 155a, 190, 155b.

In one embodiment, testing of the termination circuits 170a and 170b of the SCSI bus controllers 150a and 150b, respectively, begins with the processor 114 executing a diagnostic program 119 residing in main memory 118. The diagnostic program 119, when executed, causes the computer system 100 to perform a three-step data transfer test on the termination circuits 170a and 170b.

During the first step of the data transfer test, both the termination circuits 170a and 170b are enabled. The SCSI bus controller logic 160a then sends a certain sequence of signals to the SCSI bus controller logic 160b via the SCSI bus 155a, 190, 155b. If the SCSI bus controller logic 160b receives a different sequence of signals from the SCSI bus 155a, 190, 155b, both the termination circuits 170a and 170b are considered defective, and a corresponding error message is sent to the terminal 140. Here, both the termination circuits 170a and 170b are considered defective because if one of the termination circuits 170a and 170b is not defective, the SCSI bus 155a, 190, 155b still operates in degraded mode and it is unlikely that the SCSI bus controller logic 160b would receive a different sequence of signals from the SCSI bus 155a, 190, 155b.

If, during the first step of the of the data transfer test, the SCSI bus controller logic 160b receives the same sequence of signals from the SCSI bus 155a, 190, 155b, testing proceeds to a second step during which the termination circuit 170a is enabled and the termination circuit 170b is disabled. Then, the SCSI bus controller logic 160a sends a certain sequence of signals to the SCSI bus controller logic 160b via the SCSI bus 155a, 190, 155b. If the SCSI bus controller logic 160b receives a different sequence of signals from the SCSI bus 155a, 190, 155b, the termination circuit 170a is considered defective, and a corresponding error message is sent to the terminal 140. Here, the termination circuit 170a is considered defective because if the termination circuit 170a is not defective, the SCSI bus 155a, 190, 155b still operates in degraded mode and it is unlikely that the SCSI bus controller logic 160b would receive a different sequence of signals from the SCSI bus 155a, 190, 155b.

If, during the second step of the data transfer test, the SCSI bus controller logic 160b receives the same sequence of signals from the SCSI bus 155a, 190, 155b, testing proceeds to the third step during which the termination circuit 170a is disabled and the termination circuit 170b is enabled. Then, the SCSI bus controller logic 160a sends a certain sequence of signals to the SCSI bus controller logic 160b via the SCSI bus 155a, 190, 155b. If the SCSI bus controller logic 160b receives a different sequence of signals from the SCSI bus 155a, 190, 155b, the termination circuit 170b is considered defective, and a corresponding error message is sent to the terminal 140. Here, the termination circuit 170b is considered defective because if the termination circuit 170b is not defective, the SCSI bus 155a, 190, 155b still operates in degraded mode and it is unlikely that the SCSI bus controller logic 160b would receive a different sequence of signals from the SCSI bus 155a, 190, 155b. If, during the third step, the SCSI bus controller logic 160b receives the same sequence of signals from the SCSI bus 155a, 190, 155b, both the termination circuits 170a and 170b are determined to be operating properly without defects, and a corresponding message is sent to the terminal 140.

In one embodiment, the first step of the data transfer test is omitted. However, the second and third steps of the data transfer test are sufficient to identify a defective termination circuit, if any.

Testing of the termination circuits 170a and 170b may be performed according to another embodiment which is the same as the embodiment described above except that the termination circuits 170a and 170b are enabled/disabled in a reverse order in the second and third steps. That means during the second step of the data transfer test, the termination circuit 170a is disabled and the termination circuit 170b is enabled. During the third step, the termination circuit 170a is enabled and the termination circuit 170b is disabled. In yet another embodiment, test data is sent from the SCSI bus controller logic 160b to the SCSI bus controller logic 160a instead of from the SCSI bus controller logic 160a to the SCSI bus controller logic 160b as in the embodiments described above.

Figure 2A:
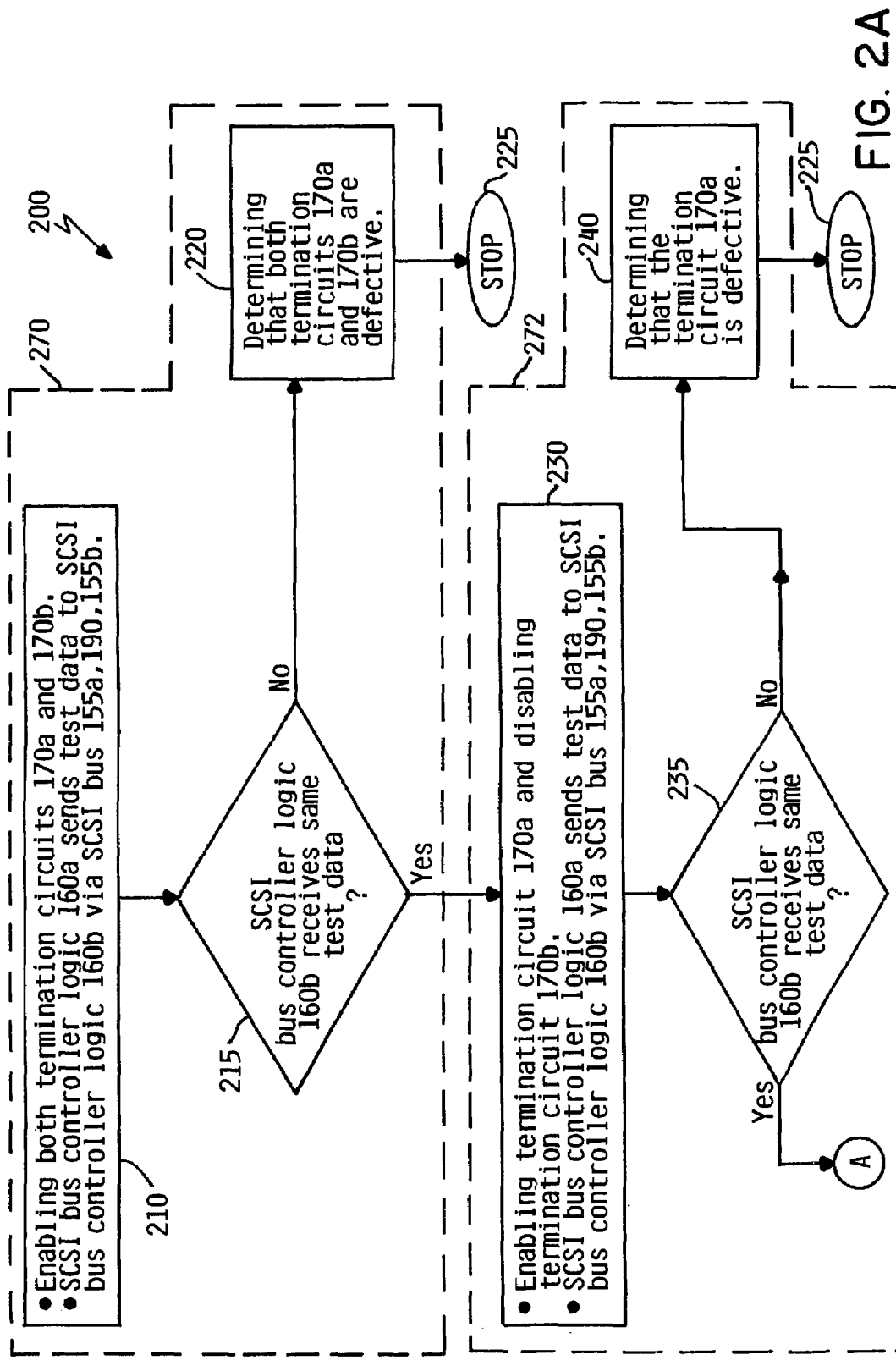
FIGS. 2A and 2B show the flowchart of a method 200 according to one embodiment.
Figure 2B:
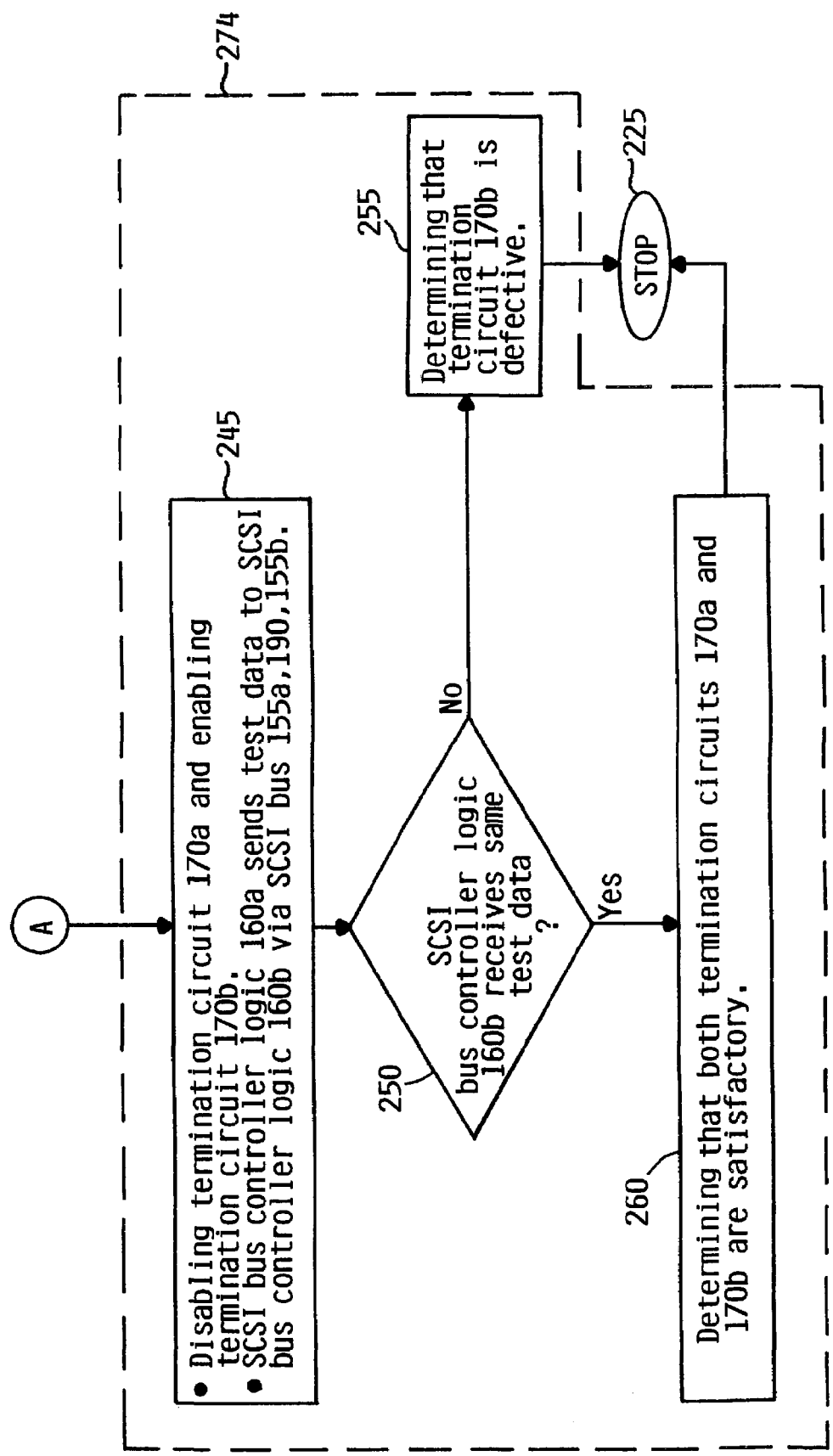

FIGS. 2A and 2B show the flowchart of a method 200 according to one embodiment. The method 200 generally comprises a three-step diagnostic test, designated as test steps 270, 272 and 274 in FIGS. 2A and 2B. A first step 270 of the test includes flow chart steps 210, 215 and 220 and is generally characterized by enabling both termination circuits of two SCSI controllers and transmitting test data between the SCSI controllers. A second step 272 of the test includes flow chart steps 230, 235 and 240 and is generally characterized by enabling one of the termination circuit and disabling the other termination circuit and then transmitting test data between the SCSI controllers. A third step 274 of the test includes flow chart steps 245, 250, 255 and 260 and is generally characterized by reversing the enabled/disabled status of the termination circuits and transmitting test data between the SCSI controllers. Each test step uses to advantage an observation by the inventors that test data transmitted between the controllers is unlikely to be corrupted if at least one termination circuit is operating properly. Persons skilled in the art will recognize that the order of the test steps may be rearranged without loss of effectiveness. Further, some of the test steps may be omitted, as will be described below.

The method 200 starts at step 210 where both the termination circuits 170a and 170b are enabled. Also in step 210, the SCSI bus controller logic 160a sends certain test data to the SCSI bus controller logic 160b via the SCSI bus 155a, 190, 155b. Then, in step 215, a determination is made as to whether the SCSI bus controller logic 160b receives the same test data as that sent to it by the SCSI bus controller logic 160a. If not, in step 220, an error message is issued to determine that both the termination circuits 170a and 170b are defective, and the method 200 stops at step 225. If yes, the method 200 proceeds to step 230.

In step 230, the termination circuit 170a is enabled and the termination circuit 170b is disabled. Also in step 230, the SCSI bus controller logic 160a sends certain test data to the SCSI bus controller logic 160b via the SCSI bus 155a, 190, 155b. Then, in step 235, a determination is made as to whether the SCSI bus controller logic 160b receives the same test data as that sent to it by the SCSI bus controller logic 160a. If not, in step 240, an error message is issued to determine that the termination circuit 170a is defective, and the method 200 stops at step 225. If yes, the method 200 proceeds to step 245.

In step 245, the termination circuit 170a is disabled and the termination circuit 170b is enabled. Also in step 245, the SCSI bus controller logic 160a sends certain test data to the SCSI bus controller logic 160b via the SCSI bus 155a, 190, 155b. Then, in step 250, a determination is made as to whether the SCSI bus controller logic 160b receives the same test data as that sent to it by the SCSI bus controller logic 160a. If not, in step 255, an error message is issued to determine that the termination circuit 170b is defective, and the method 200 stops at step 225. If yes, the method 200 proceeds to step 260 where a message is issued to determine that both the termination circuits 170a and 170b are satisfactory. The method 200 then stops at step 225.

In one embodiment, before step 210 of FIG. 2A is performed, the method 200 may further comprise a continuity test of the SCSI bus 155a, 190, 155b. During the continuity test, the SCSI bus controller logic 160a holds the signal lines of the SCSI bus 155a, 190, 155b at a certain voltage level. The SCSI bus controller logic 160b then samples the SCSI bus 155a, 190, 155b to test its continuity. If the SCSI bus controller logic 160b does not sample the same voltage level on any signal line of the SCSI bus 155a, 190, 155b, there is a discontinuity (i.e., open circuit) on that signal line of the SCSI bus 155a, 190, 155b, and a corresponding error message is sent to the terminal 140. If the SCSI bus controller logic 160b samples the same voltage level on the SCSI bus 155a, 190, 155b, there is no discontinuity on any signal line of the SCSI bus 155a, 190, 155b, and the method 200 proceeds to step 210 of FIG. 2A.

In one embodiment, the steps 210, 215, and 220 are omitted in FIG. 2A, and the method 200 begins at step 230. As a result, the method 200 is simplified, but still sufficient to identify SCSI bus controllers with defective termination circuits.

In one embodiment, the SCSI bus controllers 150a and 150b are capable of enabling and disabling the termination circuits 170a and 170b, respectively. The diagnostic program, when executed, may cause the SCSI bus controllers 150a and 150b to enable or disable the termination circuits 170a and 170b, respectively. In another embodiment, the processor 114, main memory 118 with the diagnostic program 119, and the SCSI bus controllers 150a and 150b are built on a same card to facilitate testing of the termination circuits 170a and 170b.

In summary, for a signal line of a SCSI bus having two termination circuits at its two ends, the signal line still operates in degraded mode (i.e., the signal on the line is correct as intended most of the times) when one of the two termination circuits operates properly. If both the two termination circuits do not operate properly (i.e., the termination circuits are defective) or are disabled, it is very unlikely that the signal on the signal line is correct as intended. If both the two termination circuits operate properly, it is very unlikely that the signal on the signal line will be incorrect. Accordingly, SCSI bus controllers with defective termination circuits can be identified by testing two SCSI bus controllers at a time. A wrap cable coupling the two SCSI bus controllers being tested helps transferring of test data between the two SCSI bus controllers. The testing of the two SCSI bus controllers (hereafter, the first and second SCSI bus controllers) is carried out in three settings: (a) both the termination circuits of the first and second SCSI bus controllers are enabled, (b) the termination circuit of the first SCSI bus controller is enabled and the termination circuit of the second SCSI bus controller is disabled, and (c) the termination circuit of the first SCSI bus controller is disabled and the termination circuit of the second SCSI bus controller is enabled. The testing results of the three settings identify the SCSI bus controller(s) with defective termination circuit(s).

While the foregoing is directed to embodiments of the present invention, other and further embodiments of the invention may be devised without departing from the basic scope thereof, and the scope thereof is determined by the claims that follow.

What is claimed is:

1. A method of testing termination circuits, comprising:
providing a bus having a first end and a second end, a first termination circuit coupled to the first end, and a second termination circuit coupled to the second end;
enabling the first termination circuit by a first bus controller and disabling the second termination circuit by a second bus controller;
sending first test signals to the bus from the first bus controller,
receiving by the second bus controller second test signals from the bus corresponding to the first test signals; and
determining by the second bus controller that the first termination circuit is defective if the second test signals are not the same as the first test signals.

2. The method of claim 1, further comprising:
disabling the first termination circuit by the first bus controller and enabling the second termination circuit by the second bus controller if the second test signals are the same as the first test signals;
sending third test signals to the bus from the first bus controller;
receiving by the second bus controller fourth test signals from the bus corresponding to the third test signals; and
determining by the second bus controller that the second termination circuit is defective if the fourth test signals are not the same as the third test signals.

3. The method of claim 2, further comprising determining that the first and second termination circuits are not defective if the fourth test signals are the same as the third test signals.

4. The method of claim 2, wherein the first and second bus controllers (a) comprise the first and second termination circuits, respectively, (b) are coupled to the first and second ends of the bus, respectively, and (c) are configured to enable/disable the first and second termination circuits, respectively.

5. The method of claim 4, wherein the bus is a SCSI bus.

6. The method of claim 1, wherein the first and second bus controllers are SCSI bus controllers.

7. The method of claim 1, wherein the bus is a SCSI bus.

8. A digital system for testing termination circuits, comprising:
a bus having a first end and a second end;
a first termination circuit coupled to the first end;
a second termination circuit coupled to the second end;
a first bus controller configured to:
enable the first termination circuit,
send first test signals to the bus, and
a second controller configured to:
disable the second termination circuit,
receive second test signals from the bus corresponding to the first test signals, and
determine that the first termination circuit is defective if the second test signals are not the same as the first test signals.

9. The digital system of claim 8, wherein:
the first bus controller is further configured to:
disable the first termination circuit if the second test signals are the same as the first test signals,
send third test signals to the bus,
the second bus controller is further configured to:
enable the second termination circuit if the second test signals are the same as the first test signals,
receive fourth test signals from the bus corresponding to the third test signals, and
determine that the second termination circuit is defective if the fourth test signals are not the same as the third test signals.

10. The digital system of claim 9, wherein the digital system is configured to determine that the first and second termination circuits are not defective if the fourth test signals are the same as the third test signals.

11. The digital system of claim 9, wherein the first and second bus controllers:
comprise the first and second termination circuits, respectively,
are coupled to the first and second ends of the bus, respectively, and
are configured to enable/disable the first and second termination circuits, respectively.

12. The digital system of claim 11, wherein the first and second bus controllers are SCSI bus controllers.

13. The digital system of claim 11, wherein the bus is a SCSI bus.

14. The digital system of claim 8, wherein the bus is a SCSI bus.

15. A method of testing termination circuits, comprising:
providing a bus having a first end and a second end, a first termination circuit coupled to the first end, and a second termination circuit coupled to the second end;
enabling the first and second termination circuits;
sending first test signals to the bus;
receiving second test signals from the bus corresponding to the first test signals; and
determining that both the first and second termination circuits are defective if the second test signals are not the same as the first test signals.

16. The method of claim 15, further comprising:
enabling the first termination circuit and disabling the second termination circuit if the second test signals are the same as the first test signals;
sending third test signals to the bus;
receiving fourth test signals from the bus corresponding to the third test signals; and
determining that the first termination circuit is defective if the fourth test signals are not the same as the third test signals.

17. The method of claim 16, further comprising:
disabling the first termination circuit and enabling the second termination circuit if the fourth test signals are the same as the third test signals;
sending fifth test signals to the bus;
receiving sixth test signals from the bus corresponding to the fifth test signals; and
determining that the second termination circuit is defective if the sixth test signals are not the same as the fifth test signals.

18. The method of claim 17, further comprising determining that the first and second termination circuits are not defective if the sixth test signals are the same as the fifth test signals.

19. A method of testing termination circuits, comprising:
(a) providing a SCSI bus having a first end and a second end, a first termination circuit coupled to the first end, a second termination circuit coupled to the second end, a first SCSI bus controller coupled to the first end and including the first termination circuit, and a second SCSI bus controller coupled to the second end and including the second termination circuit;
(b) enabling the first and second termination circuits with the first and second SCSI bus controllers, respectively;

(c) sending, with the first SCSI bus controller, first test signals to the bus;

(d) receiving, with the second SCSI bus controller, second test signals from the bus corresponding to the first test signals;

(e) determining that both the first and second termination circuits are defective if the second test signals are not the same as the first test signals;

(f) enabling the first termination circuit with the first SCSI bus controller and disabling the second termination circuit with the second SCSI bus controller if the second test signals are the same as the first test signals;

(g) sending, with the first SCSI bus controller, third test signals to the bus;

(h) receiving, with the second SCSI bus controller, fourth test signals from the bus corresponding to the third test signals;

(i) determining that the first termination circuit is defective if the fourth test signals are not the same as the third test signals;

(j) disabling the first termination circuit with the first SCSI bus controller and enabling the second termination circuit with the second SCSI bus controller if the fourth test signals are the same as the third test signals;

(k) sending, with the first SCSI bus controller, fifth test signals to the bus;

(l) receiving, with the second SCSI bus controller, sixth test signals from the bus corresponding to the fifth test signals;

(m) determining that the second termination circuit is defective if the sixth test signals are not the same as the fifth test signals; and (n) determining that the first and second termination circuits are not defective if the sixth test signals are the same as the fifth test signals.

* * * * *